Patented Oct. 11, 1932

1,882,175

UNITED STATES PATENT OFFICE

AUGUST BOSSE, OF HERFORD, GERMANY

PROCESS FOR THE PREPARATION OF A CELLULAR RAW MATERIAL SUITABLE FOR ARTIFICIAL MATERIALS, PARTICULARLY ARTIFICIAL SILK

No Drawing. Application filed August 10, 1929, Serial No. 385,086, and in Germany February 2, 1929.

The invention relates to a process for the preparation of a raw material suitable for artificial materials, particularly artificial silk. The process is especially distinguished by its simplicity as from a natural or from an intermediate product, a manufacture of the raw material, which is suitable for the preparation of artificial materials, can be obtained direct.

According to this invention the process for the preparation of a raw material comprises the use of a cellular raw material, such as for example peat, which is boiled with ammonia under pressure, acidified and after a time is washed until neutral, and then removed and treated with alkali or earth alkali-lye, whereupon the further treatment follows by means of changing into esters or in any other known manner.

Cellulose, as it is obtained in its cheapest forms, for instance as peat, which forms the basis for carrying out the process, can proceed completely with the use of raw peat, as well as with preliminary treated peat, such as compressed dry fiber of peat (Torfmull).

According to one process in which peat containing about 75% water is used, as this raw material can be obtained in very large quantities, and in its natural condition, is boiled with an ammonia solution under a pressure of 1-2 atmospheres for about 3 hours in an autoclave. For 100 kg. peat, 5 kg. ammonia solution (normal solution) are used. After expiration of the boiling period, the mass is soaked on a sieve until completely clean water runs off and is then acidified. If mineral acids are used, a 5% solution of, for example, sulphuric acid is sufficient, if organic acids are used, a 15% solution will be necessary. The mass is then allowed to stand for half an hour and is then washed with water, until rendered neutral, whereupon it is covered with a 3% solution of chloride of lime or other bleaching agent in water, and bleached. In this condition the mass is allowed to stand for one hour.

After this time the mass is washed and treated with a 10% sodium bicarbonate solution (NaH CO$_3$), washed and pressed. Instead of NaH CO$_3$ other chlorine combining substances, such as alkalies or earth alkalies, can also be used. The pressed cake, is dried, broken up and placed in a suitable container. The raw material so obtained can be converted into a final product by various means. If an acetate structure is to result for example, the following method is employed:

For each 250 gr. of the mass there is added 950 g. acetic anhydride, 600 g. glacial acetic acid, and 12½ g. sulphuric acid of 66° Bé.

During the reaction considerable heat is envolved so that a continual cooling is necessary, in order that the temperature does not exceed 30°. The solution remains for about an hour at the temperature of 30°. If the reaction is noticeably lower, then it must be heated. In any case care has to be taken that the temperature, also after cessation of the reaction heat, is to be maintained at 30° for about 4 hours, so that the whole time of treatment amounts to 7 hours. During the entire reaction period the mass is under a pressure of about 10 kilograms per square centimeter.

The reaction period cannot always be calculated in advance, but by tests it can be ascertained, whether after deacidifying and drying, solubility in chloroform is present. If such a solubility is present, the process is broken off, otherwise it is proceeded with.

The prepared syrup like mass is treated with 10 g. glycerine and maintained for 3 hours at a temperature of 85°. Hereupon follows finishing in water, centrifuging, drying etc.

For the preparation of artificial fibres follows solution in acetone, whereupon pressing follows.

If artificial materials, such as sheets are to be prepared, additional materials, such as camphor or camphor substitute, are added after solution in acetone and the further treatment occurs in the usual manner.

If mechanically pre-treated peat, for instance compressed dry fiber of peat (Torfmull), is used as a basis, the proportions of the quantities during the change into an acetic acid ester are varied in the following manner.

For each 250 g. mechanically pre-treated peat mass 1350 g., acetic anhydride, 350 g. glacial acetic acid, and 17½ g. sulphuric acid, are employed. The pressure must be 20 atmospheres and the temperature is to be maintained at 48 to 49° for about 6 hours. The addition of glycerine after complete changing into a cellulose acetate soluble in chloroform is not necessary.

Having now particularly described and ascertained the nature of my said invention, and in what manner the same is to be performed, I declare that what I claim is:

The process of obtaining cellular material suitable for the production of artificial silk, consisting in freeing peat from impurities by boiling the same under pressure in a solution of ammonia, thereafter washing the same in water until clear, thereafter acidifying the same, and thereafter rewashing the same with water.

In witness whereof I affix my signature.

AUGUST BOSSE.